(12) United States Patent
Kunihiro et al.

(10) Patent No.: US 8,537,212 B2
(45) Date of Patent: Sep. 17, 2013

(54) RECORDING APPARATUS AND RECORDING METHOD THEREOF

(75) Inventors: Takeshi Kunihiro, Kanagawa (JP); Masashi Uchida, Tokyo (JP); Eriko Matsui, Tokyo (JP); Tomohiro Hayakawa, Saitama (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 13/052,286

(22) Filed: Mar. 21, 2011

(65) Prior Publication Data

US 2011/0234828 A1  Sep. 29, 2011

(30) Foreign Application Priority Data

Mar. 29, 2010 (JP) ................................ 2010-074307

(51) Int. Cl.
*A61B 1/06* (2006.01)
*H04N 5/228* (2006.01)
(52) U.S. Cl.
USPC ........................................ 348/77; 348/208.16
(58) Field of Classification Search
None
See application file for complete search history.

(56) References Cited

U.S. PATENT DOCUMENTS

2009/0059031 A1* 3/2009 Miyakoshi ................. 348/222.1
2009/0208083 A1* 8/2009 Hayes et al. ................. 382/131

FOREIGN PATENT DOCUMENTS

JP           63-233392      9/1988
WO    WO 2007/063516    *  6/2007

* cited by examiner

*Primary Examiner* — Albert Cutler
(74) *Attorney, Agent, or Firm* — Wolf, Greenfield & Sacks, P.C.

(57) ABSTRACT

Disclosed is a recording apparatus including: a movement cycle determining section which receives moving image data including image contents of an object which performs a movement in which a movement state and a non-movement state are alternately and periodically repeated, and determines an operating period which corresponds to the movement state and a static period which corresponds to the non-movement state; and a recording control section which records the number of frame image data, per unit time, for forming the moving image data in the static period to be smaller than in the operating period, when the moving image data is recorded.

4 Claims, 10 Drawing Sheets

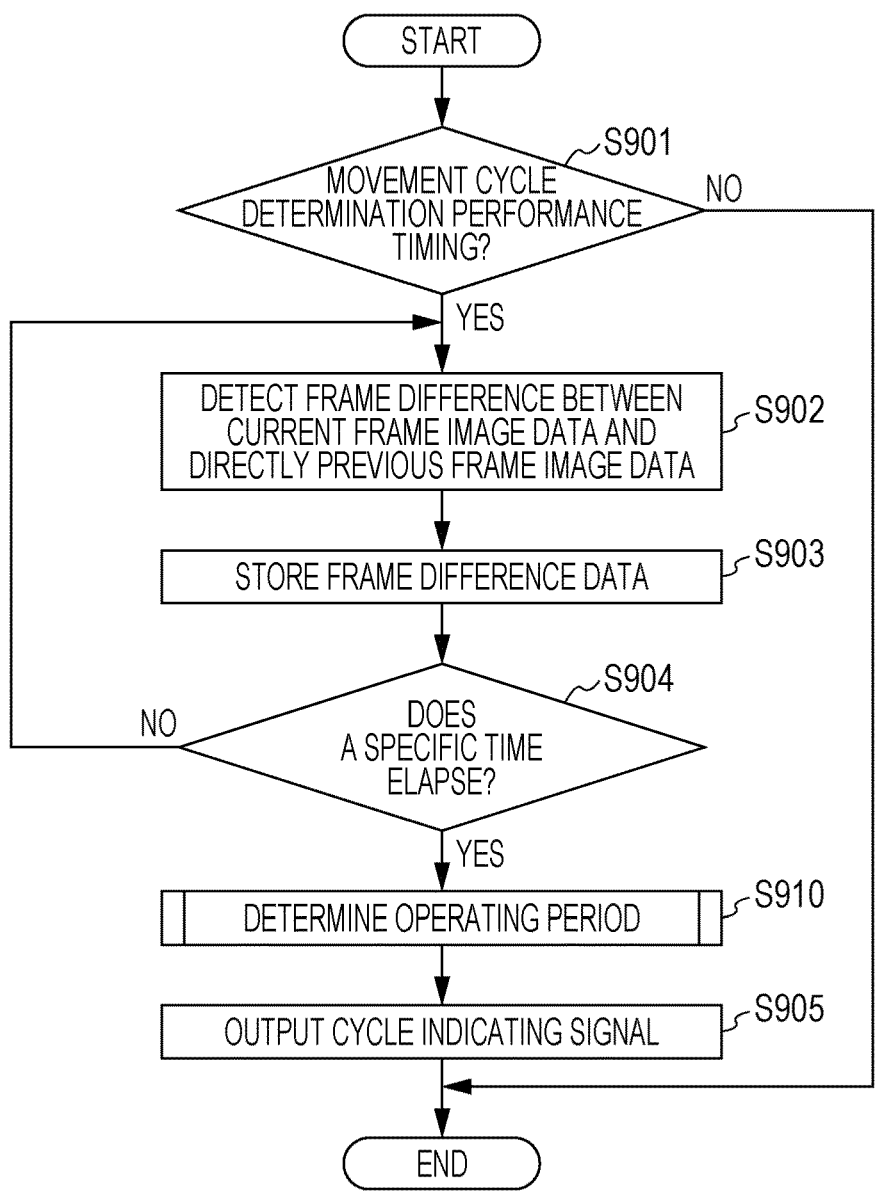

RECORDING APPARATUS AND RECORDING METHOD THEREOF

BACKGROUND OF THE INVENTION

1. Field of the Invention

The present invention relates to a recording apparatus, and particularly, to a recording apparatus which records moving image data having image contents of an object which performs a movement with periodicity, and a recording method thereof.

2. Description of the Related Art

In the field of regenerative medicine, a technique for reproducing cells or for restoration of body functions, tissues, organs, or the like of a human body lost due to accidents, diseases, or the like using cultured cells created by culturing cells has been developed. A variety of cell tissues can be used to manufacture such cultured cells. One of them is cardiomyocytes, which are used for treatment of the heart. The cultivated cardiomyocyte performs movement corresponding to beats by itself. Thus, in a manufacturing process of the cultivated cardiomyocyte, for example, it is necessary to perform a quality evaluation of whether the above movement is preferable or not.

When performing the quality evaluation of such cultivated cardiomyocyte, for example, visual observation is performed at the present time. However, in the visual observation, the quality evaluation is likely to depend on a subjective view of an observer, and thus, it is difficult to obtain an objective and reliable evaluation result.

Thus, there is known the following technique in the related art. That is, luminance data is obtained by recording a digital signal obtained by imaging a cardiomyocyte in a personal computer. The luminance of a measurement point is automatically measured with respect to an image having the luminance data obtained in this way, to thereby measure the beat cycle of the cardiomyocyte on the basis of the change in the measured luminance (For example, refers to Japanese Unexamined Patent Application Publication No. 63-233392 (FIG. 1)).

In order to reliably reproduce a movement based on beats of the cultivated cardiomyocyte as a moving image, an image quality of a certain level or higher should be provided. That is, the number of frame images per unit time should be a certain level or higher. That is, a moving image having a high frame rate of a certain level or higher should be provided. Further, image resolution should also have a certain level or higher. In the current technology, it is sufficiently possible to generate and record moving image data with a resolution and frame rate necessary for an evaluation of a cultured cardiomyocyte.

However, as the resolution and the frame rate of the moving image become high, the data size of the moving image becomes large. For example, in reality, when a system for evaluating the cultured cardiomyocyte is built, it may be difficult to allocate most of the capacity of a storing apparatus for recording the moving image due to certain restrictions.

SUMMARY OF THE INVENTION

It is desirable to provide a recording apparatus and a recording method thereof which maintains the image quality of moving image data, when evaluating a movement of an object which performs a periodical movement such as a cultured cardiomyocyte using the moving image data, and which reduces the size thereof.

According to an embodiment of the invention, there is provided a recording apparatus including: a movement cycle determining section which receives moving image data including image contents of an object which performs a movement in which a movement state and a non-movement state are alternately and periodically repeated, and determines an operating period which corresponds to the movement state and a static period which corresponds to the non-movement state; and a recording control section which records the number of frame image data, per unit time, for forming the moving image data in the static period to be smaller than in the operating period, when the moving image data is recorded. Thus, the moving image is recorded at a high frame rate in the image movement state of the object, and the moving image is recorded at a low frame rate in the image non-movement state of the object.

Further, in this embodiment, the movement cycle determining section may include a frame difference detecting section which detects a frame difference value of image data for two continuous frames in a time series of frame image data for forming the moving image data; and a period determining section which determines the operating period on the basis of the detected frame difference value and determines a period other than the operating period as the static period. Thus, the operating period and the static period are determined by detecting the frame difference value of image data for two continuous frames in the time series of the moving image data.

Further, in the embodiment, the period determining section may include a peak detecting section which detects a peak of the frame difference value; and an operating period determining section which determines the operating period on the basis of the time corresponding to the frame difference value in which the peak is detected. Thus, the operating period is determined by detecting the peak of the frame difference value.

Further, in this embodiment, the peak detecting section may receive frame difference values which are detection targets in time series and detect the peak on the basis of a comparison result between the frame difference value which are the detection targets and a threshold value, and the period determining section may further include a threshold value setting section which changes and sets the threshold value according to a difference between the detection target time corresponding to the frame difference value which is the current detection target and the next peak appearance time and thereafter estimated on the basis of the time corresponding to the frame difference value in which the peak is detected before the detection target time. Thus, the threshold value for the peak detection is changed according to the peak appearance possibility of the frame difference value.

Further, in this embodiment, the movement cycle determining section may receive moving image data corresponding to a specific time at predetermined time intervals and determines the operating period and the static period. Thus, the determination results of the operating period and the static movement are updated at predetermined time intervals.

Further, in this embodiment, the recording control section may record the moving image data formed by the frame image data for every frame period in the operating period, and record the moving image data formed by one piece of frame image data for every predetermined plurality of frame periods in the static period. Thus, in the operating period, the moving image is recorded at a normal frame rate, and in the static period, the moving image is recorded at a frame rate lower than the normal frame rate.

According to the embodiments of the invention, it is possible to maintain a sufficient image quality for movement evaluation of an object which performs a periodical movement and to reduce the size of the moving image data.

BRIEF DESCRIPTION OF THE DRAWINGS

FIG. 9 is a diagram illustrating an example of a process routine performed by a movement cycle determining section;

DESCRIPTION OF THE PREFERRED EMBODIMENTS

Hereinafter, exemplary embodiments of the invention will be described with reference to the accompanying drawings. The description will be made in the following order.

1. First embodiment (Example in which an operating period and a static period are detected and a moving image is recorded by thinning a frame in the static period)

2. Modifications

1. First Embodiment

[Configuration Example of Cultured Cardiomyocyte Evaluation System]

Figure 1:
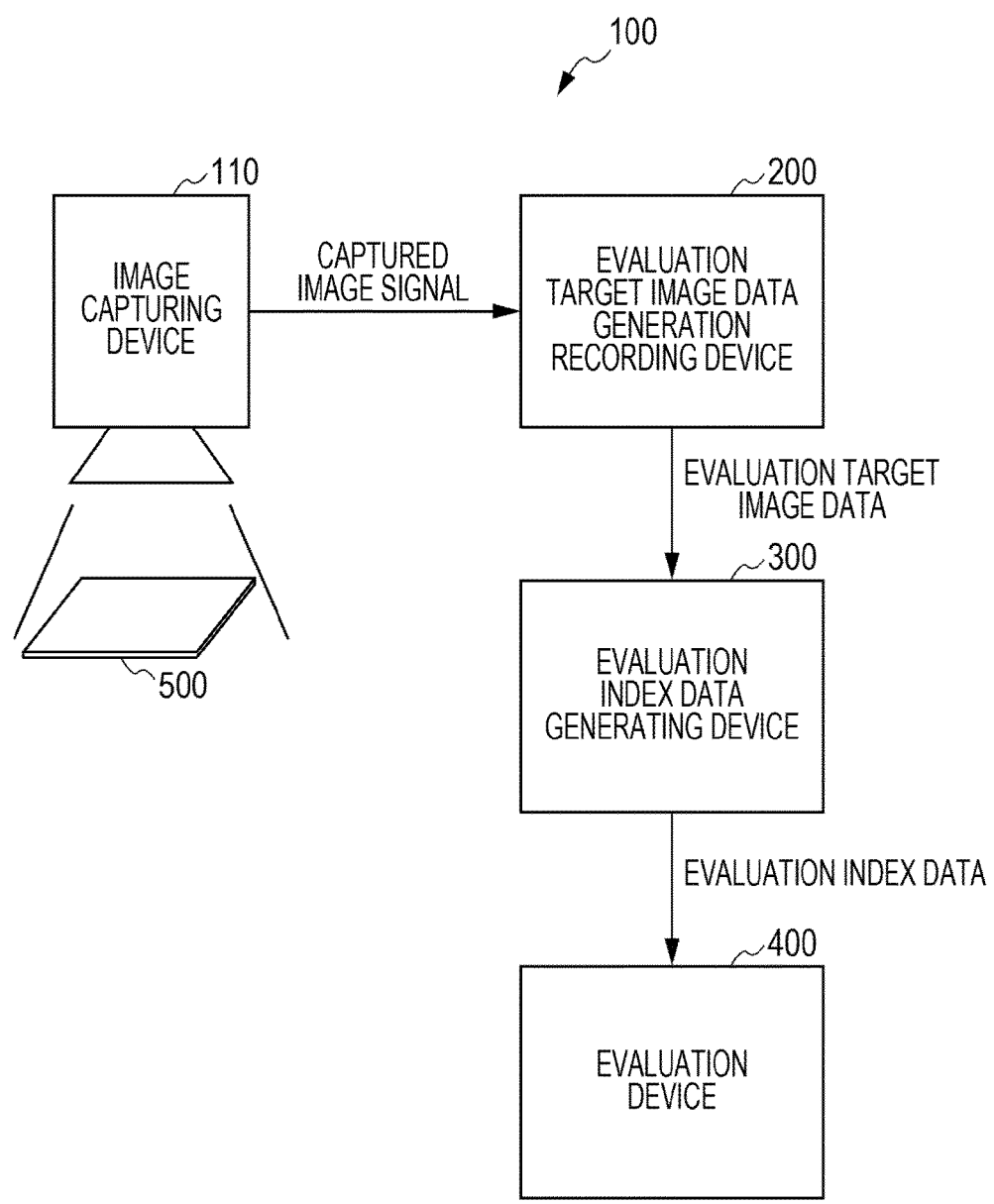
FIG. 1 is a diagram illustrating a configuration example of a cultured cardiomyocyte evaluation system according to an embodiment of the invention.

FIG. 1 is a diagram illustrating a configuration example of a cultured cardiomyocyte evaluation system 100 according to a first embodiment of the invention. The cultured cardiomyocyte evaluation system 100 shown in the figure evaluates the quality of a cultured cardiomyocyte 500.

In regenerative medicine, a technique of treating a variety of tissues, organs or the like of the human body using cultured cells is widely used. Cultured cells are cell tissues created by culturing cells, and the cultured cardiomyocyte 500 refers to cultivated cardiomyocyte created for heart treatment. Recently, a technique has been developed in which the cells cultured in this way are mass-produced to supply sufficient amounts of the cultured cells to medical practices at low cost. In a case where the cultured cells are mass-produced in this way, the created cultured cells should be efficiently and reliably evaluated.

The cultured cardiomyocyte 500 performs movement corresponding to beats by itself. The cultured cardiomyocyte 500 can evaluate whether the movement according to the beats is preferable, to thereby determine the quality thereof. On the basis of this determination, the cultured cardiomyocyte evaluation system 100 records moving image data obtained by imaging the cultured cardiomyocyte 500, and performs evaluation on the basis of the movement detection result for the recorded moving image data. Thus, it is possible to obtain a detailed and reliable evaluation result, compared with non-invasive and visual evaluation.

To this end, the cultured cardiomyocyte evaluation system 100 includes an image capturing device 110, an evaluation target image data generation recording device 200, an evaluation index data generating device 300, and an evaluation device 400, as shown in the figure, for example.

The image capturing device 110 images the cultured cardiomyocyte 500 which is an evaluation target. In the figure, the cultured cardiomyocyte 500 is directly imaged by the image capturing device 110, but in reality, for example, microscopic images of the cultured cardiomyocyte 500 are captured. Further, at the time of image capturing, an image capturing position of the image capturing device 110 with respect to the cultured cardiomyocyte 500 is fixed.

The evaluation target image data generation recording device 200 generates evaluation target image data on the basis of an image signal input from the image capturing device 110, and records the generated evaluation target image data for storage. Here, the generated evaluation target image data is moving image data generated from the image signal obtained by capturing the cultured cardiomyocyte 500, for example. Further, the moving image data which is the evaluation target image data corresponds to a predetermined specific time amount. That is, the moving image data is formed by predetermined pieces of frame image data. Further, the evaluation target image data generation recording device 200 records the generated moving image data in an internal recording medium, for example, to thereby store the evaluation target image data.

The evaluation index data generating device 300 receives the moving image data which is the evaluation target image data stored by the evaluation target image data generation recording device 200, for example, and generates evaluation index data used as an index for evaluation of the cultured cardiomyocyte 500. The evaluation device 400 obtains the evaluation result by processing the evaluation index data generated by the evaluation index data generating device 300.

[Configuration Example of Evaluation Index Data Generating Device]

Figure 2:
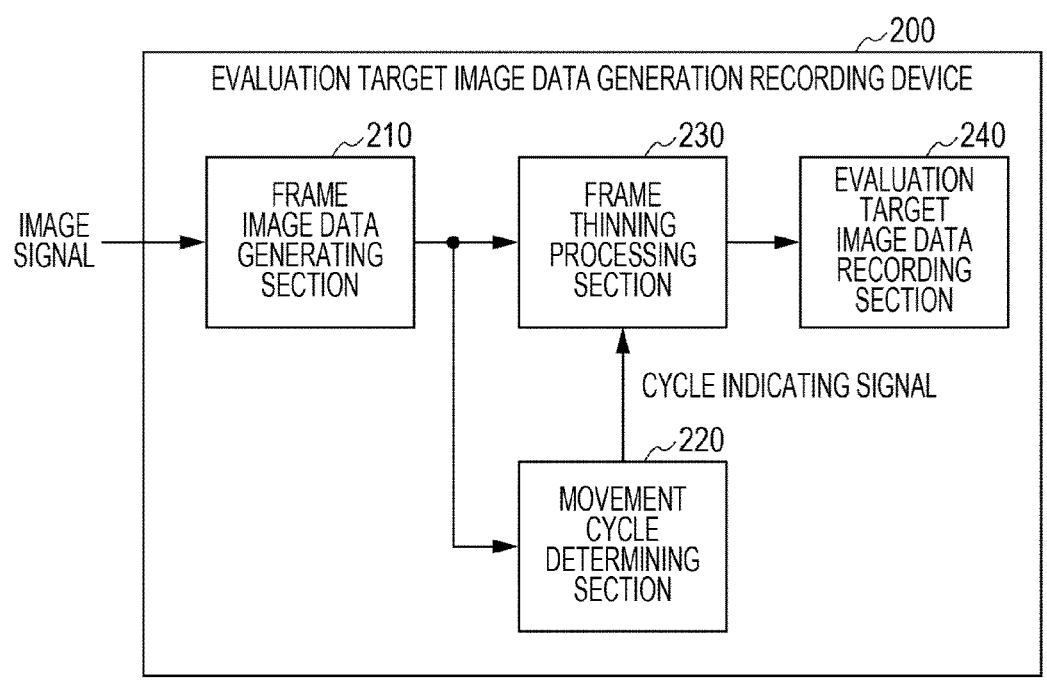
FIG. 2 is a diagram illustrating a configuration example of an evaluation target image data generation recording device according to an embodiment of the invention.

FIG. 2 is a diagram illustrating a configuration example of the evaluation target image data generation recording device 200. The evaluation target image data generation recording device 200 in the figure includes a frame image data generating section 210, a movement cycle determining section 220, a frame thinning processing section 230, and an evaluation target image data recording section 240.

The frame image data generating section 210 receives image signals input from the image capturing device 110 and sequentially generates frame image data for forming the moving image data by means of a predetermined format. As a specific example of a frame cycle according to an embodiment of the invention, for example, there is a frame cycle of 120 to 240 frames per second. The frame image data generated by the frame image data generating section 210 is output to the movement cycle determining section 220 and the frame thinning processing section 230.

As understood from the above description, the moving image formed by the frame image data generated by the frame image data generating section 210 has image contents of the cultured cardiomyocyte 500, and the cultured cardiomyocyte 500 in the image performs the beat movement. The beat movement has a characteristic that an operating period when the cultured cardiomyocyte 500 actually generates movement and a static period when the cultured cardiomyocyte 500 does not generate movement and nearly remains static alternately appear. Further, the operating period and the static period are not generated at random time intervals, and are periodically generated at a certain degree of constant time intervals.

The movement cycle determining section 220 determines a movement cycle on the basis of the frame image data which is sequentially input. That is, the movement cycle determining section 220 determines the timings when the operating period and the static period are generated. Thus, in this embodiment of the invention, for example, a start time and an end time of the operating period are estimated as described later. A period other than the operating period becomes the static period. The determined timings when the operating period and the static period are generated are periodic, and thus, have constant time intervals. Further, the movement cycle determining section 220 outputs a cycle indicating a signal indicating whether a current time is either of the operating period or the static period, according to the determination result of the respective timings of the operating period and the static period.

The frame thinning processing section 230 thins frame image data input from the frame image data generating section 210 according to the cycle indicating a signal and outputs the thinned frame image data to the evaluation target image data recording section 240. The frame thinning processing section 230 is an example of a recording control section disclosed in the Claims.

The evaluation target image data recording section 240 is provided with a predetermined recording medium, for example, in which the frame image data output from the frame thinning processing section 230 as described above is recorded and stored. That is, the moving image data obtained by capturing the cultured cardiomyocyte 500 by the image capturing device 110 is stored. The moving image data stored in this way becomes evaluation target image data which is used by the evaluation index data generating device 300.

[Configuration Example of Movement Cycle Determining Section]

Figure 3:
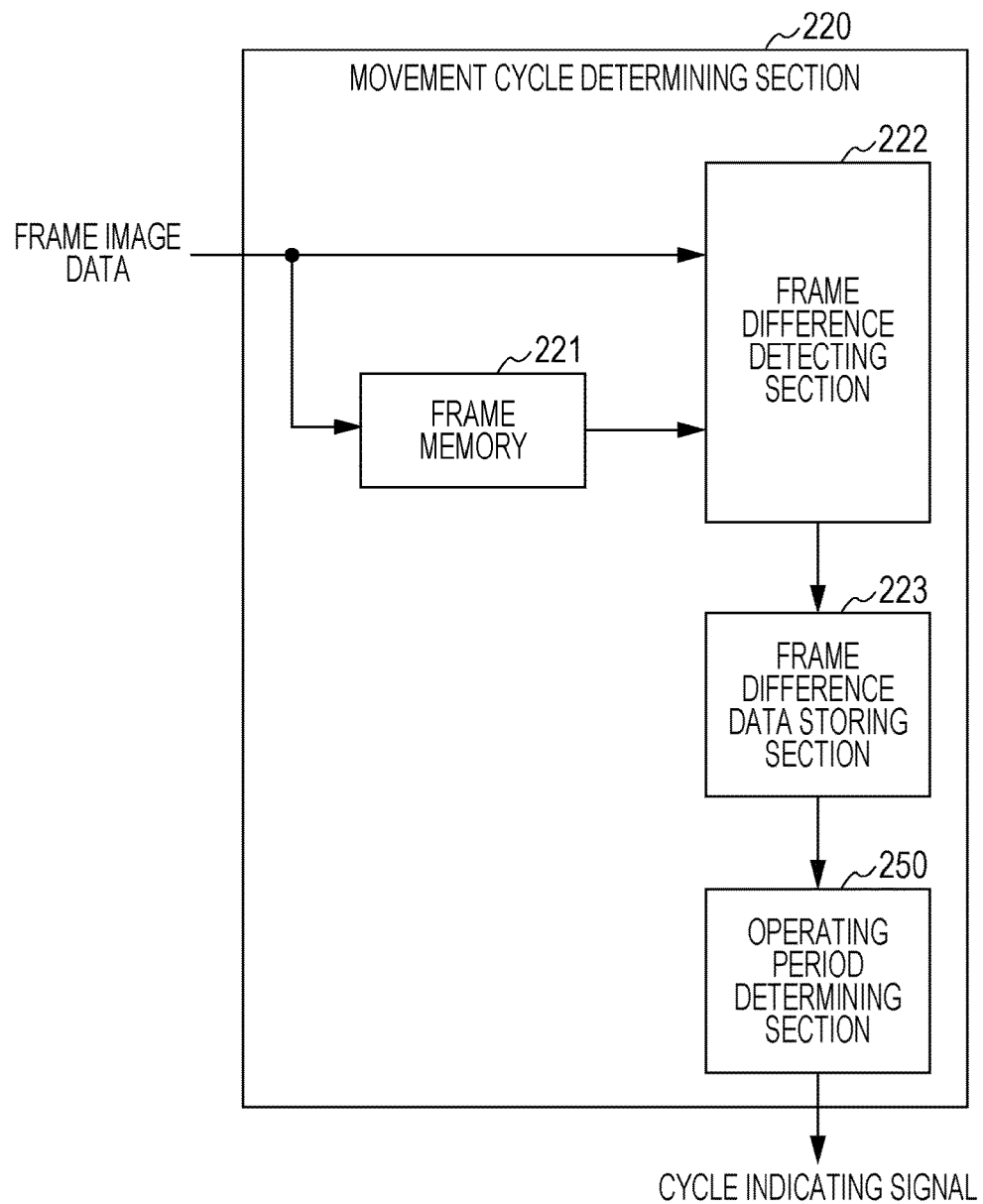
FIG. 3 is a diagram illustrating a configuration example of a movement cycle determining section according to an embodiment of the invention.

FIG. 3 is a diagram illustrating a configuration example of the movement cycle determining section 220. The movement cycle determining section 220 in the figure includes a frame memory 221, a frame difference detecting section 222, a frame difference data storing section 223 and an operating period determining section 250.

The frame memory 221 holds the input frame image data by a time period corresponding to one frame period. The frame difference detecting section 222 detects a difference between the current frame image data input from the frame image data generating section 210 and the previous frame image data input from the frame memory 221. The difference detection is performed as follows, for example.

The frame difference detecting section 222 calculates a difference value between pixels in the same positions in two pieces of input frame image data. Then, the difference values obtained for the pixels are summed to obtain one piece of frame difference data corresponding to one frame period. The frame difference data storing section 223 stores and holds the frame difference data obtained by the frame difference detecting section 222.

In the embodiment of the invention, the frame difference detection process through the frame difference detecting section 222 is performed by a specific time at predetermined time intervals, for example, in a period when imaging recording of the cultured cardiomyocyte 500 is performed. The frame difference data storing section 223 stores T frame difference data obtained by the frame difference detection process performed over the specific time.

Here, a value of the frame difference data (frame difference value) represents the amount of movement of the cultured cardiomyocyte 500. As such a technique of calculating the movement amount of an object in an image, for example, a movement detection process through a block matching or the like can be employed. It is possible to obtain movement vector information through the movement detection process. However, in the embodiment of the invention, in order to determine a beat movement cycle, the movement amount has only to be calculated. In this case, the movement detection process is excessive as a process of merely calculating the movement amount, and thus, it is not efficient. Thus, in the embodiment of the invention, the movement amount is calculated by a process called frame difference detection lighter than the movement detection.

The operating period determining section 250 determines a timing of an operating period using the T frame difference data, as the T frame difference data is completely stored in the frame difference data storing section 223, for example. The operating period determining section 250 is an example of a period determining section disclosed in the Claims.

[Description about Operating Period and Static Period Determined by Movement Cycle Determining Section]

Figure 4:
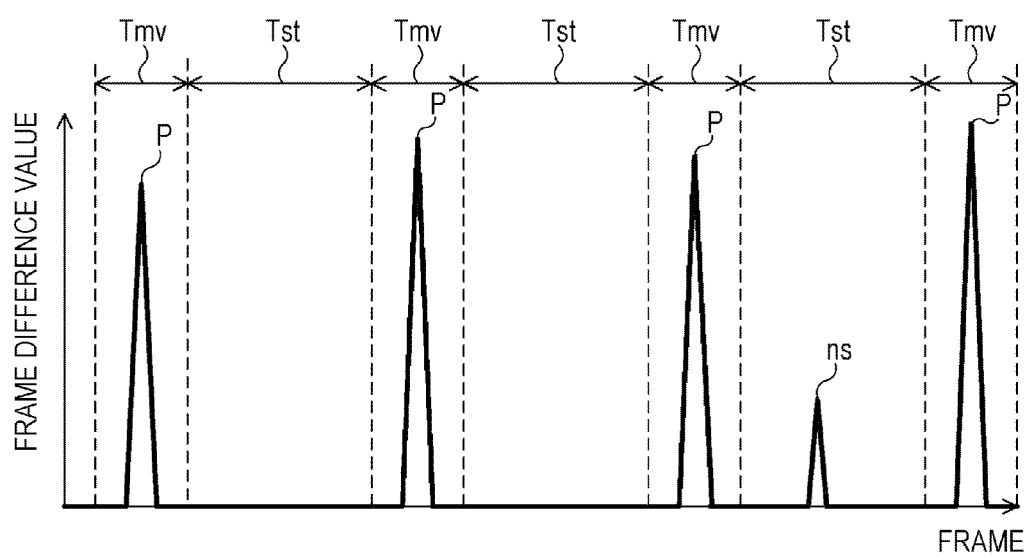
FIG. 4 is a diagram illustrating the relationship between frame difference value time series and an operating period and a static period.

FIG. 4 is a diagram schematically illustrating the frame difference data stored in the frame difference data storing section 223 in time series. The longitudinal axis is the frame difference data value (frame difference value), and the transverse axis represents the frame, that is, time.

In the time series of the frame difference value shown in FIG. 4, peak values P rapidly increasing up to a constant value or more at approximately constant time intervals are obtained. The peak values P are obtained as the cultured cardiomyocyte 500 actually moves in the beat movement. As described above, the beat movement has the periodic characteristic. Thus, the peak values P appear with periodicity. In a period when change in the frame difference value corresponding to the peak value P does not occur, the frame difference value becomes approximately zero. The state where the frame difference value is zero represents that the cultured cardiomyocyte 500 is in a static state without movement in the beat movement. Thus, as shown in the figure, the time series of the frame difference values represents that the operating period Tmv and the static period Tst alternately appear at time intervals which can be considered as constant, respectively. The operating period Tmv is a period when a change in the frame difference value corresponding to the peak value P occurs as the cultured cardiomyocyte 500 moves. On the other hand, the static period Tst is a period when the frame difference value becomes approximately zero as the cultured cardiomyocyte 500 is approximately static.

The movement cycle determining section 220 determines occurrence timings of the operating period Tmv and the static period Tst, on the basis of the frame difference data indicating the movement of the cultured cardiomyocyte 500. Thus, the operating period determining section 250 in FIG. 3 determines the occurrence timing of the operating period Tmv from among the operating period Tmv and the static period Tst. Since a period other than the operating period Tmv becomes the static period Tst, the determination of the occurrence timing of the operating period Tmv corresponds to determination of the occurrence timing of the static period Tst. Further, in FIG. 7, a peak value appearing as a value smaller than the peak value P is noise ns generated as the cultured cardiomyocyte 500 temporarily performs an irregular movement, for example. The operating period determining section 250 in this embodiment changes a threshold value compared with the frame difference value so that the noise ns is not mistakenly detected as the original peak value P as described later. Thus, it is possible to determine the occurrence timing of the operating period Tmv with high accuracy.
[Configuration Example of Operating Period Determining Section]

Figure 5:
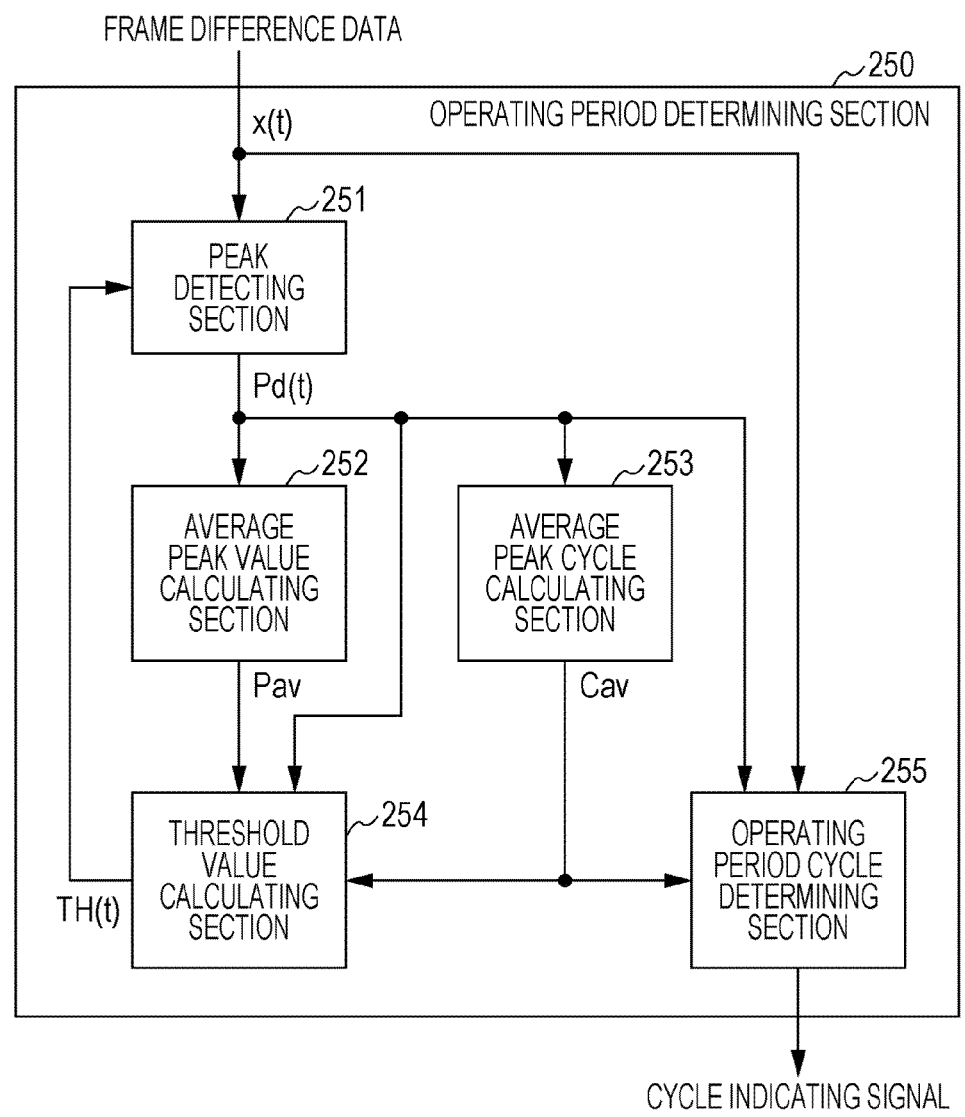
FIG. 5 is a diagram illustrating a configuration example of an operating period determining section.

FIG. 5 is diagram illustrating a configuration example of the operating period determining section 250. The operating period determining section 250 in the figure includes a peak detecting section 251, an average peak value calculating section 252, an average peak cycle calculating section 253, a threshold value calculating section 254, and an operating period cycle determining section 255.

The peak detecting section 251 inputs T frame difference data stored in the frame difference data storing section 223 in time series, and detects whether each time frame difference data is a peak value P. The frame difference data used by the peak detecting section 251 is already stored in the frame difference data storing section 223 by T. Thus, in order to read out the frame difference data from the frame difference data storing section 223 through the peak detecting section 251, synchronization with the frame cycle is not necessary. Accordingly, for example, a process performed by each section in the operating period determining section 250 which will be described later can be performed by an operation of higher speed than the frame cycle. Further, hereinafter, the peak detecting section 251 treats the frame period corresponding to the frame difference data which is a detection target as the current time, and displays it as a time t.

In this case, the peak detecting section 251 determines, in a case where frame difference data x(t) at the time t satisfies the following peak detection condition equation using a threshold value TH(t) set corresponding to the time t, that it is the peak.

$$x(t) > x(t-1), x(t) > x(t+1), x(t) > TH(t)$$

That is, the frame difference data x(t) which has a value larger than the frame difference data x(t−1) and x(t+1) at the previous and next times and has a value larger than the threshold value TH(t) is detected as a peak. As it is detected that the frame difference data x(t) at the time t is the peak, the peak detecting section 251 outputs peak detection information Pd(t) indicating the detection result. The peak detection information Pd(t) includes a frame difference data value which is the peak value P and information indicating the time when the peak value P is detected.

The average peak value calculating section 252 calculates an average peak value Pav which is an average value of N peak values $P_1$ to $P_N$ detected before the time t corresponding to the frame difference data which is the current detection target. For example, the average peak value Pav can be calculated by the following equation, using the k-th detected peak value as $P_k$.

$$Pav = \frac{1}{N}\sum_{k=1}^{N} P_k \qquad \text{[Equation 1]}$$

The equation calculates a simple average as an average peak value Pav, but a calculation method of the average value is not particularly limited thereto. For example, the average value may be calculated as a weighted average. Further, here, an average value of all peak values P obtained up to the time t corresponding to the current time is calculated. Alternatively, a movement average of the peak values P of the latest predetermined numbers from among the peak values P obtained up to the time t corresponding to the current time may be calculated as the average peak value P. A calculation method for the average peak value Pav may be determined in consideration of the accuracy of the operating period Tmv and the static period Tst obtained by the actual determination result, for example. This is similarly applied to an average peak cycle Cav which will be described later.

The average peak cycle calculating section 253 calculates an average value (average peak cycle) Cav in a cycle when N peak values $P_1$ to $P_N$ appear which are detected using the previous frame difference data with reference to the time t corresponding to the frame difference data which is the current detection target as the target thereof. The average peak cycle Cav can be calculated by the following equation, assuming that a time when the k-th peak value $P_k$ is detected is $t_k$, and a time when the (k+1)-th peak value $P_{k+1}$ is detected is $t_{k+1}$.

$$Cav = \frac{1}{N}\sum_{k=1}^{N}(t_k - t_{k+1}) \qquad \text{[Equation 2]}$$

The threshold value calculating section 254 sets the threshold value TH(t) at the time t, using the average peak value Pav and the average peak cycle Cav obtained on the basis of the peak detection result up to the time t corresponding to the frame difference data which is the current detection target. The threshold value TH(t) can be calculated by the following equation, assuming that a coefficient at the time t is α(t), for example.

$$TH(t)=\alpha(t)\cdot Pav$$

As shown in the equation, the threshold value TH(t) at the time (t) is obtained by multiplying the coefficient α(t) at the time t by the average peak value Pav, but the coefficient α(t) is determined as follows.

Figure 6:
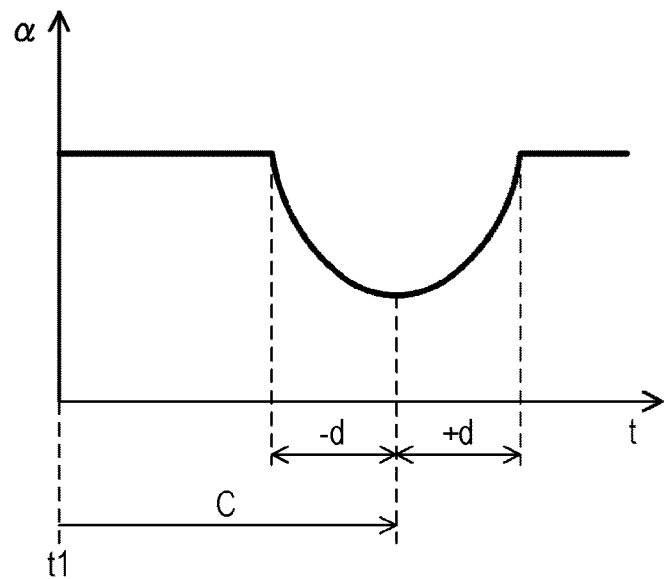
FIG. 6 is a diagram illustrating a setting example of a coefficient used when a threshold value calculating section calculates a threshold value.

FIG. 6 is a diagram illustrating the coefficient α according to a lapse of the time t set by the threshold value calculating section 254. The threshold value calculating section 254 sets the coefficient α to a predetermined maximum value in a period up to time (t1+C−d), using a time t1 when the peak value P is finally detected up to the current time t as an origin. Further, the maximum value is set in a period after the time (t1+C+d). Further, in a period from the time (t1+C−d) to the time (t1+C+d), the coefficient α is set to decrease as it moves to a time (t1+C), and to be a minimum value in the time (t1+C). Further, the threshold value calculating section 254 determines which value the coefficient α corresponding to the current time t has, on the basis of the above-described setting. The determined value becomes the coefficient α(t). The time (t1+C) when the coefficient α becomes the minimum value becomes a peak appearance time which is estimated that there is a highest possibility that the peak value P at the next time and thereafter is detected, on the basis of the average peak cycle Cav calculated at the current time. That is, at the timing when there is a high possibility that the peak value P is detected, the coefficient α is set to a small value, and on the other hand, at the timing when there is a low possibility that the peak value P is detected, the coefficient α is set to a large value. Thus, the threshold value TH(t) is set to a high value at the time when there is a low possibility that the peak value P is detected, and is set to a low value at the time when there is a high possibility that the peak value P is detected. The threshold value calculating section 254 is an example of a threshold value setting section disclosed in the Claims.

The peak detecting section 251 can reliably detect the peak value P obtained according to actual beats, by using the threshold value TH(t) set as described above. On the other hand, the peak detecting section 251 operates so that the peak of the noise generated at a period other than the timing when the peak value P appears is not detected. In this way, in this embodiment of the invention, it is possible to detect the presence or absence of the peak value P with high accuracy, by changing the threshold value TH(t) to be set in accordance with the appearance cycle of the estimated peak value P. Thus, it is possible to obtain the operating period Tmv calculated by the operating period cycle determining section 255 which will be described later, with high accuracy.

The operating period cycle determining section 255 determines the occurrence timing of the operating period Tmv. As described above, the occurrence timing of the operating period Tmv is the start time and the end time of the operating period Tmv which periodically occurs. The operating period cycle determining section 255 receives an average peak cycle Cav finally obtained by performing the peak detection for the entire T frame difference data, when determining the occurrence timing of the operating period Tmv. Further, the operating period cycle determining section 255 obtains information on peak detection information Pd(t1) which is finally detected from the peak detecting section 251 in a state where the peak detection for the entire T frame difference data is completed. That is, the operating period cycle determining section 255 obtains information on the finally detected peak value P and the time t1. Further, the operating period cycle determining section 255 receives the frame difference data x(t).

Figure 7:
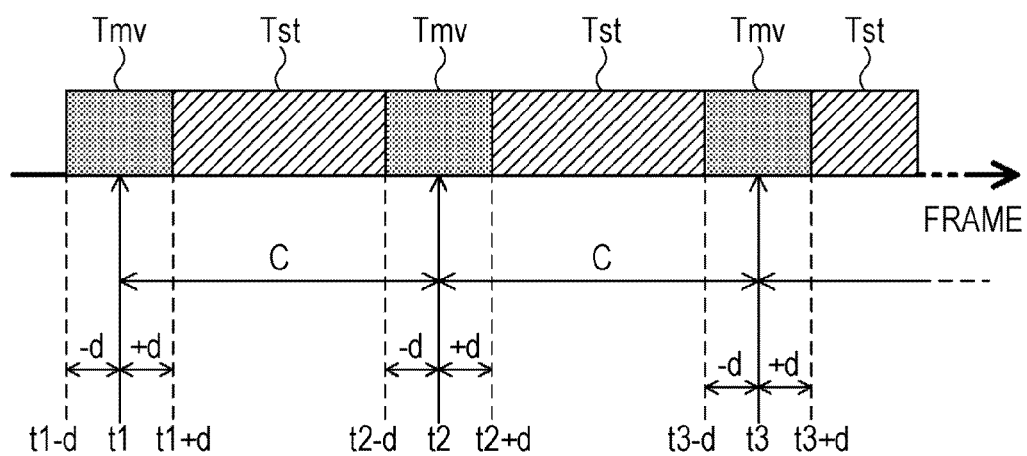
FIG. 7 is a diagram illustrating a calculation example of a timing of an operating period Tmv by means of an operating period cycle determining section.

In FIG. 7, the time t1 represents a time when the final peak value P is detected. The operating period cycle determining section 255 firstly calculates a time span "±d" using the time t1 when the final peak value P is detected as an origin. If the final peak value obtained at the time t1 is expressed as P(t1), the time span "±d" satisfies the following condition.

$$P(t1\pm d) > \beta \cdot P(t1)(0 < \beta < 1)$$

That is, according to the equation, a period when a change in the frame difference value according to the peak value P before and after the time t1 occurs is obtained as the time span "±d" with reference to the time t1 when the final peak value P is detected. Here, firstly, a period due to the time span "±d" with reference to the time t1 is set to the operating period Tmv. The time span "±d" obtained in this way returns to the threshold value calculating section 254, for example, and thus, can be used as the time span "±d" with reference to the peak appearance time when setting the coefficient α(t) as described in FIG. 6.

Next, the operating period cycle determining section 255 calculates a time t2 when the average peak cycle Cav elapses from the time t1 and sets a period due to the time span "±d" with reference to the time t2 as the next operating period Tmv. Further, the operating period cycle determining section 255 calculates a time t3 when the average peak cycle Cav elapses from the time t2 and sets a period due to the time span "±d" with reference to the time t2 as the next operating period Tmv. In this way, on the basis of the average peak cycle Cav and the time span "±d", the occurrence timing which becomes the operating period Tmv after the time t1 is calculated. Further, if the operating period Tmv is calculated in this way, the occurrence timing of the static period Tst which is a period other than the operating period Tmv is also specified, in a similar way.

The operating period cycle determining section 255 outputs, to the frame thinning processing section 230, a cycle indicating a signal indicating that the current time is either one of the operating period Tmv and the static period Tst, on the basis of the occurrence timing of the operating period Tmv and the static period Tst as calculated above. The operating period cycle determining section 255 is an example of an operating period determining section disclosed in the Claims.

[Frame Thinning Processing Section]

Figure 8A:
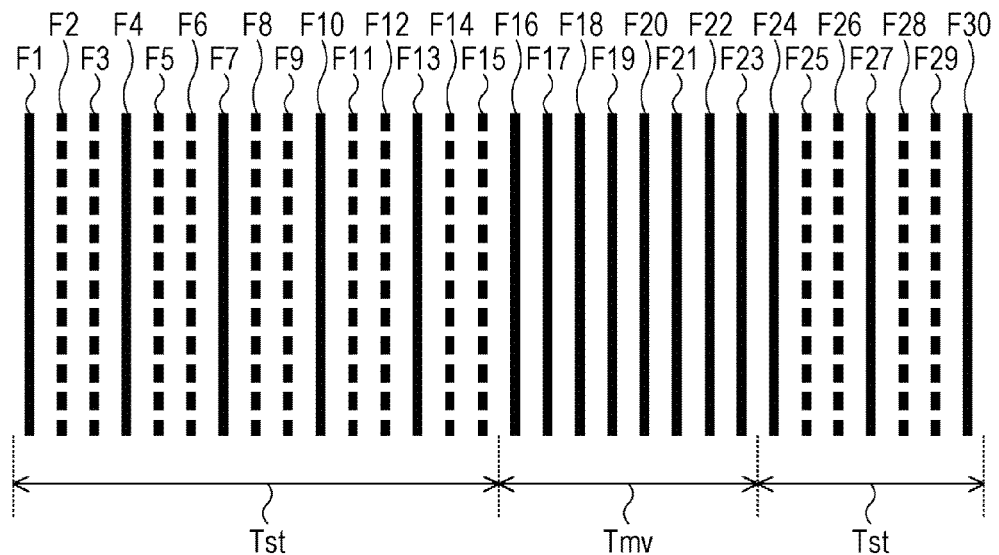
FIG. 8 is a diagram illustrating an operation example of a frame thinning processing section.
Figure 8B:
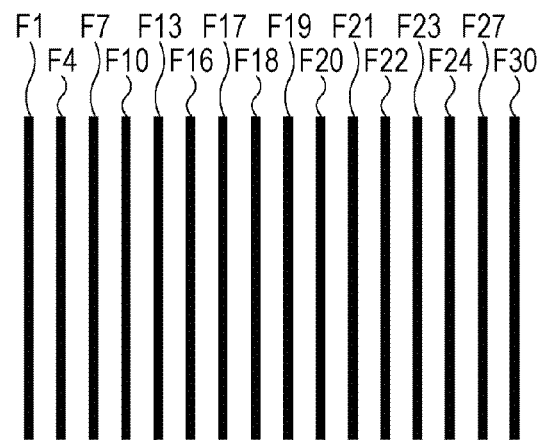

FIGS. 8A and 8B are diagrams schematically illustrating an example of an operation performed by the frame thinning processing section 230 according to a cycle indicating a signal. FIG. 8A illustrates, for example, frame image data F1 to F30 which is sequentially input to the frame thinning processing section 230 from the frame image data generating section 210 for every frame period. Further, the cycle indicating a signal indicates the static period Tst corresponding to a period when the frame image data F1 to F15 is input. The frame thinning processing section 230 performs recording by thinning the frame image data indicated by a wavy line as shown in the figure, for example, over the static period Tst. That is, in this case, the frame thinning processing section 230 thins frame image data corresponding to two frames for every three frames, extracts the remaining one piece of frame image data and records it in the evaluation target image data recording section 240. As a result, the moving image is recorded at a frame rate lower than a normal rate in the static period Tst.

Next, as shown in FIG. 8A, it is assumed that the cycle indicating a signal is switched to the state of indicating the operating period Tmv in a period when the frame image data F16 to F22 is input. Accordingly, the frame thinning processing section 230 outputs each of the frame image data F16 to F23 to the evaluation target image data recording section 240 as shown in the figure, for recording. In this way, the moving image is recorded at a normal frame rate in the operating period Tmv.

Then, in FIGS. 8A and 8B, the cycle indicating a signal is changed into the state of indicating the static period Tst at the timing of the frame image data F24. Accordingly, in a similar way to the frame image data F1 to F15, the frame thinning processing section 230 records the frame image data while performing thinning for two frames. The thinning rate corresponding to this type of thinning is ⅔, for example.

If the frame image data is recorded in this way, in the evaluation target image data recording section 240, the frame image data shown in FIG. 8B, among the frame image data F1 to F30 shown in FIG. 8A, is recorded as the evaluation target image data. That is, the frame image data F1, F4, F7, F10, F13, F16 to F24, F27 and F30 is recorded. As understood by comparison of FIG. 8A and FIG. 8B, in this embodiment of the invention, it is possible to considerably reduce the number of frame image data per unit time recorded as the moving image data, compared with a case where normal recording is performed at a normal frame rate. That is, it is possible to significantly reduce the size of the moving image data corresponding to the same imaging time.

Here, since the static period Tst is a static period without movement of the cultured cardiomyocyte 500, the frame image data in the static period Tst has approximately the same image content. Accordingly, there is no problem even though the frame rate is set to a low value. On the other hand, in the operating period Tmv, a normal frame rate is set, and thus, a temporal directional resolution sufficient for evaluating the movement state is obtained. In this way, according to this embodiment of the invention, it is possible to maintain a sufficient image quality for evaluation, while enabling the considerable size reduction, with respect to the moving image data (evaluation target image data) obtained by image-capturing and recording the cultured cardiomyocyte 500.

The thinning rate shown in FIG. 8B is an example, and thus may be appropriately set in consideration of the temporal directional resolution necessary as the static period Tst, in reality. Further, when reproducing the evaluation target image data recorded as shown in FIG. 8B, the evaluation target image data recording section 240 continuously reproduces the frame image data F1 over three frames, and then similarly continuously reproduces the frame image data F4 over three frames. Then, in a similar way, the evaluation target image data recording section 240 continuously reproduces the frame image data F7, F10 and F13 over three frames. That is, the evaluation target image data recording section 240 continuously reproduces the frame image data thinning-recorded corresponding to the static period Tst over the number of frames according to the thinning rate. Further, the evaluation target image data recording section 240 sequentially reproduces the frame image data F16 to F24 recorded corresponding to the operating period Tmv by one frame as it is. By performing the reproduction in this way, the movement of the cultured cardiomyocyte 500 according to the same temporal process as the time when the cultured cardiomyocyte 500 is image recorded, reappears.

[Process Routine Example of Evaluation Target Image Data Generation Recording Apparatus]

FIG. 9 is a flowchart illustrating an example of a process routine performed by the movement cycle determining section 220 in the evaluation target image data generation recording device 200. A process in each step shown in the figure is appropriately performed by any one of the frame difference detecting section 222 in the movement cycle determining section 220 shown in FIG. 3 and the operating period determining section 250. Further, for example, the process performed by the frame difference detecting section 222 and the operating period determining section 250 may be realized by hardware. Further, for example, the process may be realized by allowing a CPU (Central Processing Unit), a DSP (Digital Signal Processor), or the like to execute a program.

Firstly, in FIG. 9, for example, the frame difference detecting section 222 waits for the movement cycle determining performance timing, in a state where the frame image data is generated by the frame image data generating section 210 (step S901). As described above, the series of processes which is the movement cycle determination is set in advance as processes performed over a specific time necessary to obtain T frame difference data at predetermined time intervals, for example.

As it is determined in step S901 that the movement cycle determination performance timing comes, the frame difference detecting section 222 performs a process of detecting the difference value of the frame image data at the current time and the previous time (step S902). The detected difference value is stored in the frame difference data storing section 223 as the frame difference data.

Next, the frame difference detecting section 222 repeats the processes in step S902 and step S903, until it is determined that a specific time elapses after the start of the process of initially detecting the difference value in step S902 (step S904). Thus, the frame difference data is sequentially generated as the frame period elapses, and is stored in the frame difference data storing section 223.

In step S904, in a stage where it is determined that the specific time elapses, T frame difference data is stored in the frame difference data storing section 223. Thus, the operating period determining section 250 performs a process (operating period determining section) of determining the cycle time of the operating period Tmv (step S910). As the cycle time of the operating period Tmv is determined, the cycle time of the static period Tst is specified as described above. Then, the operating period determining section 250 outputs the cycle indicating a signal indicating that the current time is any one of the operating period Tmv and the static period Tst according to the determination result, to the frame thinning processing section 230 (step S905).

As described above, the movement cycle determination process is performed at specific time intervals, for example. Accordingly, the operating period Tmv and the static period Tst indicated by the cycle indicating a signal are updated according to the specific time intervals. For example, a configuration may be employed in which the movement cycle determination process is once performed at the start of the image recording of the cultured cardiomyocyte 500, and thereafter, the cycle indicating a signal indicating the operating period Tmv and the static period Tst which are determined at this time is output. However, there is a possibility that a gap between the actual beat timing and the timing of the operating period Tmv and the static period Tst gradually becomes great as time elapses. Thus, if the operating period Tmv and the static period Tst are periodically updated as in the embodiment of the invention, it is possible to trace the actual beat timing even in the image recording of the cultured cardiomyocyte 500 over a long time.

Figure 10:
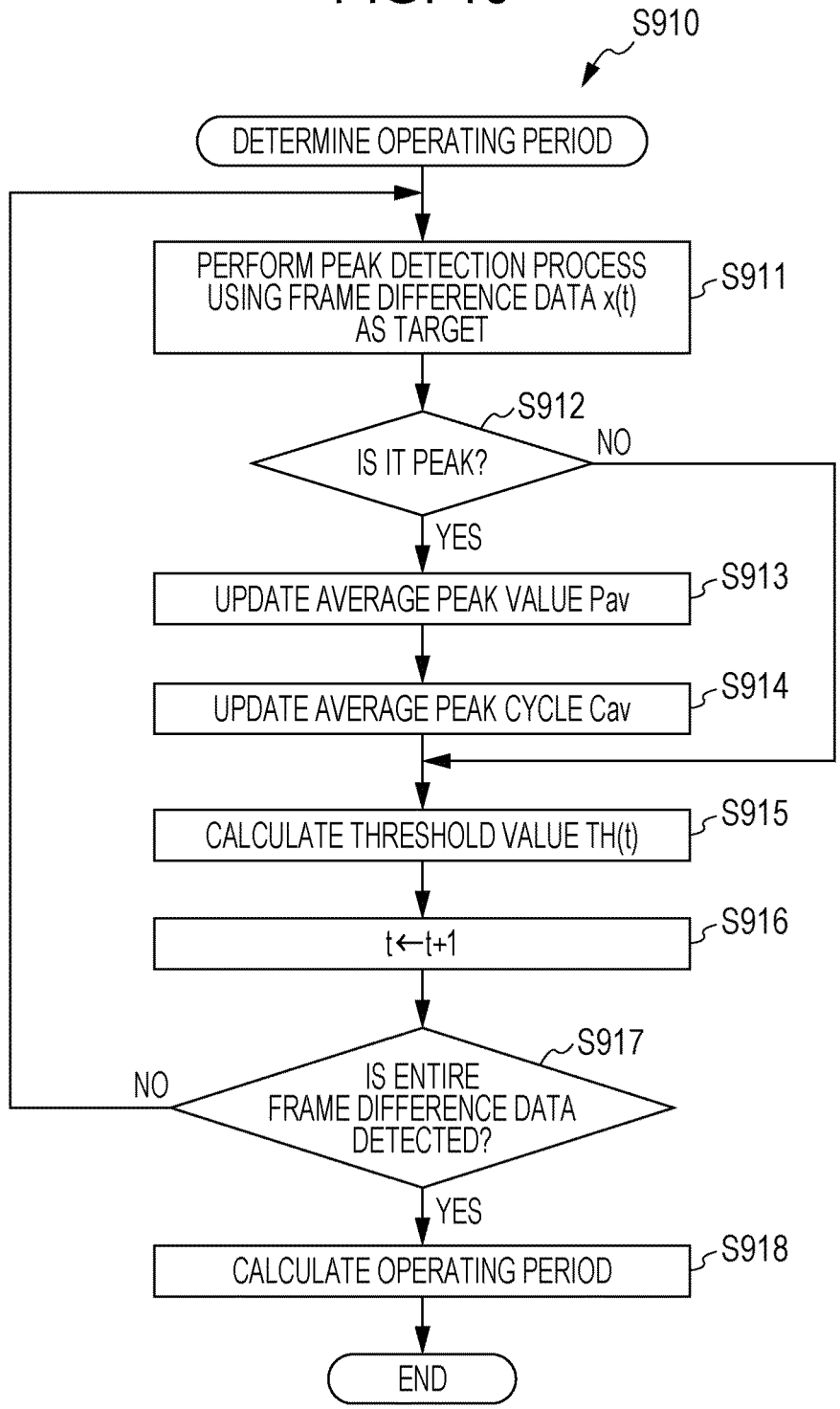
FIG. 10 is a diagram illustrating a routine example of a operating period determination process performed by an operating period determining section.

FIG. 10 is a flowchart illustrating a routine example of a process for the operating period determination shown in step S910 in FIG. 9. The process in each step shown in the figure is a process of appropriately performing any one of the peak detecting section 251, the average peak value calculating section 252, the average peak cycle calculating section 253, the threshold value calculating section 254, and the operating period cycle determining section 255 in the operating period determining section 250 shown in FIG. 5. Further, the process shown in the figure can also be realized by allowing hardware, CPU, DSP, or the like to execute a program.

Firstly, the peak detecting section 251 performs a peak detection process for the frame difference data x(t) corresponding to the time t, among the frame difference data stored in the frame difference data storing section 223 (step S911). For example, the peak detecting section 251 detects whether the input frame difference data x(t) is treated as the peak value P, according to whether the frame difference data x(t) satisfies the above-described peak detection condition equation. When detecting the peak based on the peak detection condition equation, the frame difference data x(t) and the previous and next frame difference data thereof x(t−1), x(t+1) are read out from among the frame difference data stored in the frame difference data storing section 223 for use. Thus, as a result of the peak detection process, it is determined whether the peak value P is actually detected (step S912).

As it is determined that the peak value P is actually detected in step S912, the average peak value calculating section 252 utilizes information on the peak detection information Pd(t) which is newly detected at the current time and newly calculates and updates the average peak value Pav (step S913). At this time, for example, the calculation indicated as (Equation 1) is performed. Similarly, the average peak cycle calculating section 253 newly calculates and updates the average peak cycle Cav by the calculation indicated by (Equation 2), for example (step S914). On the other hand, in a case where it is determined that the peak value P is not actually detected in step S912, the processes of step S913 and S914 are skipped.

Next, the threshold value calculating section 254 calculates the threshold value TH(t) corresponding to the time t as described in FIG. 6 (step S915). Subsequently, the peak detecting section 251 increments a variant "t" indicating time (frame) (step S916). Further, it is determined whether the peak detection is performed for the entire T frame difference data stored in the frame difference data storing section 223 (step S917). Here, in a case where it is determined that the peak detection is not performed for the entire frame difference data, the routine returns to step S911. Thus, peak detection with respect to the frame difference data x(t) of the next time t, updating of the average peak value Pav and the average peak cycle Cav according to the detection result, calculation of the threshold value TH(t), and so on are performed. Thus, if it is determined in step S917 that the peak detection is performed for the entire frame difference data, the operating period cycle determining section 255 performs a process of calculating the operating period Tmv as described in FIG. 7, for example (step S918).

Figure 11:
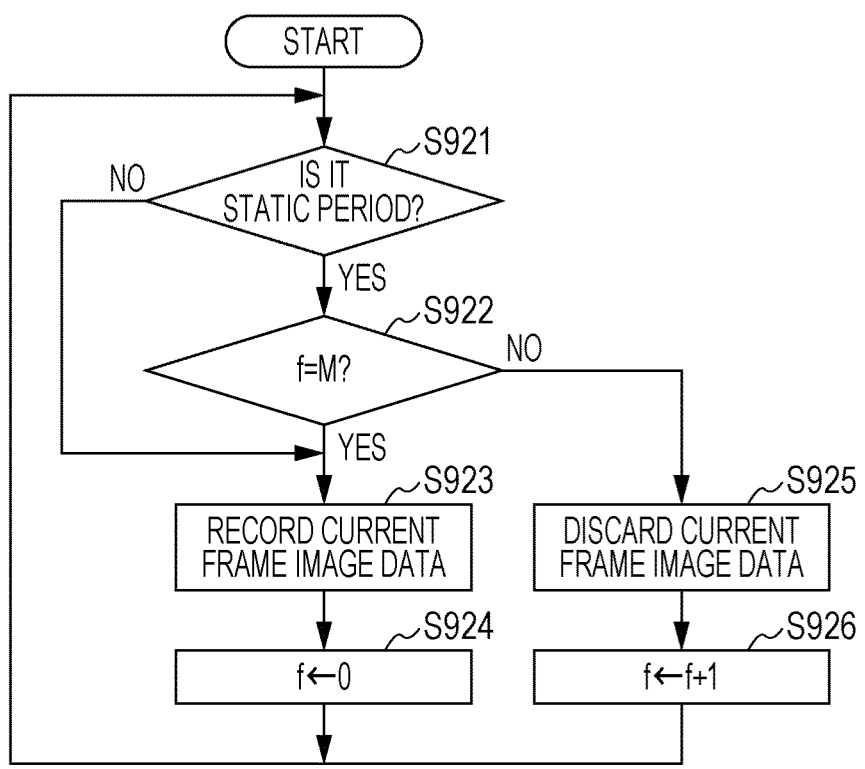
FIG. 11 is a diagram illustrating an example of a process routine performed by a frame thinning processing section.

FIG. 11 is a flowchart illustrating an example of a process routine performed by the frame thinning processing section 230. The process shown in the figure can also be realized by allowing hardware, CPU, DSP, or the like to execute a program.

Firstly, the frame thinning processing section 230 determines whether the current cycle indicating a signal indicates the static period Tst, at every start timing of the frame period when the frame image data is input (step S921).

In a case where it is determined in step S921 that the static period Tst is not indicated, the cycle indicating a signal represents the operating period Tmv. Thus, in this case, the current frame image data input in the current frame period is recorded in the evaluation target image data recording section 240 (step S923). Next, zero is substituted for the variable "f" (step S924), and then, the routine returns to the process of step S921 at the start timing of the next frame period. As understood as described later, when thinning of the frame image data is performed as the cycle indicating a signal indicates the static period Tst, the variable "f" represents the number of times of continuously performing the thinning of the frame image data.

Further, in a case where it is determined in step S921 that the current cycle indicating a signal indicates the static period Tst, it is determined whether the current variable "f" is in a state of being equivalent to a maximum value M (step S922). The maximum value M is determined at the thinning rate of the actually set frame image data. Specifically, as shown in FIG. 8B, if the thinning frame rate is set so that two frames are thinned for every three frames (thinning frame rate "⅔"), the maximum value M becomes "2".

In a case where it is determined in step S922 that the variable "f" does not reach the maximum value M, the current frame image data is discarded (step S925). That is, the current frame image data is not recorded but thinned. Further, as the current frame image data is discarded in step S925, the variable "f" is incremented, and then, the routine returns to step S921. Further, in a case where it is determined in step S922 that the variable "f" reaches the maximum value M, the processes of steps S923 and S924 are performed. Thus, in the static period Tst, the recording of the frame image data is performed while performing thinning at a predetermined thinning rate.

2. Modifications

Next, modifications of the embodiment of the invention will be described. Firstly, in the above-described embodiment, when the image recording of the cultured cardiomyocyte 500 is performed, for example, occurrence timings of the operating period Tmv and the static period Tst are determined whenever T frame difference data is stored in the frame difference data storing section 223. However, for example, the operating period determining section 250 may receive the frame difference data obtained by the frame difference detecting section 222 in real time to determine the respective occurrence timings of the operating period Tmv and the static period Tst.

In this case, the movement cycle determining section 220 is configured so that the frame difference data storing section 223 is omitted in FIG. 3 and the frame difference data obtained by the frame difference detecting section 222 for every frame cycle is input to the operating period determining section 250. Further, the peak detecting section 251 of the operating period determining section 250 performs peak detection for the frame difference data x(t) input for every frame cycle. At this time, if the peak detection based on the previous peak detection condition equation is performed, the timing when it is actually detected that the frame difference data x(t) is the peak value P is a time (t+1) after one frame. As the peak value P is detected, the average peak value calculating section 252 and the average peak cycle calculating section 253 newly calculate and update the average peak value Pav and the average peak cycle Cav, using the currently newly obtained peak detection information P(t), respectively. Further, the threshold value calculating section 254 calculates the threshold value TH(t) corresponding to the current time t, using the current average peak value Cav, according to the same process as described in FIG. 6, and then inputs the calculated threshold value TH(t) to the peak detecting section 251. Then, the operating period determining section 255 calculates the respective occurrence timings of the subsequent operating period Tmv and static period Tst according to the same process as described in FIG. 7, for example, whenever the peak value P is newly detected.

Further, in the above-described embodiment of the invention, in order to enhance the accuracy of the peak detection so that the noise is not mistakenly detected as the peak value P, the threshold value TH(t) is changed according to the timing of the estimated peak value P. On the other hand, in the modification thereof, for example, in a case where there is little possibility that the noise is actually mistakenly detected as a peak, the peak detection may be performed by setting the threshold value TH as a fixed value.

Furthermore, in the above-described embodiment, in the operating period Tmv, the recording is performed at a normal frame rate, and in the static period Tst, the recording is performed at a frame rate lower than the normal frame rate. On the other hand, for example, in the operating period Tmv, the recording may be performed at a frame rate higher than the normal frame rate, and in the static period Tst, the recording may be performed at the normal frame rate. That is, in the invention, in the static period Tst, the moving image may be recorded at a frame rate lower than that in the operating period Tmv.

The embodiments are examples for realizing the invention. As described above, elements in the embodiments of the invention correspond to specific elements in the Claims, respectively. Similarly, specific elements in the Claims correspond to elements having the same references in the embodiments of the invention. However, the invention is not limited thereto, and a variety of modifications can be realized in a range without departing from the spirit of the invention.

Further, the process routines described in the embodiments of the invention may be provided as a method of such a series of routines, and may be provided as a program for allowing a computer to execute the series of routines and a recording medium which stores the program. As the recording medium, a CD (Compact Disk), an MD (MiniDisc), a DVD (Digital Versatile Disk), a memory card, a Blu-ray Disk (registered trademark), or the like may be used.

The present application contains subject matter related to that disclosed in Japanese Priority Patent Application JP 2010-074307 filed in the Japan Patent Office on Mar. 29, 2010, the entire contents of which are hereby incorporated by reference.

It should be understood by those skilled in the art that various modifications, combinations, sub-combinations and alterations may occur depending on design requirements and other factors insofar as they are within the scope of the appended Claims or the equivalents thereof.

What is claimed is:

1. A recording apparatus comprising:
a movement cycle determining section to receive moving image data including image contents of an object that performs a movement in which a movement state and a non-movement state are alternately and periodically repeated, and to determine an operating period which corresponds to the movement state and a static period which corresponds to the non-movement state; and
a recording control section to record a number of frame image data, per unit time, for forming the moving image data in the static period to be smaller than in the operating period, when the moving image data is recorded;
wherein the movement cycle determining section includes:
a frame difference detecting section to detect a frame difference value of image data for two continuous frames in a time series of frame image data for forming the moving image data;
a period determining section to determine the operating period at least in part on the basis of the detected frame difference value and to determine a period other than the operating period as the static period;
wherein the period determining section includes:
a peak detecting section to detect a peak of the frame difference value;
an operating period determining section to determine the operating period at least in part on the basis of time, corresponding to the frame difference value, in which the peak is detected;
wherein the peak detecting section receives frame difference values which are detection targets in time series and detects the peak at least in part on the basis of a comparison result between the frame difference values which are the detection targets and a threshold value, and
wherein the period determining section further includes a threshold value setting section to change and to set the threshold value according to a difference between detection target time corresponding to the frame difference value, which is the current detection target, and a next peak appearance time and thereafter estimated, at least in part on the basis of the time corresponding to the frame difference value in which the peak is detected before the detection target time.

2. The recording apparatus according to claim 1, wherein the movement cycle determining section receives moving image data corresponding to a specific time at predetermined time intervals and determines the operating period and the static period.

3. The recording apparatus according to claim 1, wherein the recording control section records the moving image data formed by the frame image data for every frame period in the operating period, and records the moving image data formed by one piece of frame image data for every predetermined plurality of frame periods in the static period.

4. A recording method comprising the steps of:
receiving moving image data including image contents of an object which performs a movement in that which a movement state and a non-movement state are alternatively and periodically repeated, and determining an operating period which corresponds to the movement state and a static period which corresponds to the non-movement state;
wherein the receiving includes detecting a frame difference value of image data for two continuous frames in a time series of frame image data to form the moving image data;
determining the operating period at least in part on the basis of the detected frame difference value to determine a period other than the operating period as the static;
wherein determining the operating period includes detecting a peak of the frame difference value and determining the operating period at least in part on the basis of time, corresponding to the frame difference value, in which the peak is detected;
wherein the peak detecting includes receiving frame difference values which are detection targets in time series and detecting the peak at least in part on the basis of a comparison result between the frame difference values and the threshold value;
wherein the period determining includes changing and setting the threshold value according to a difference between detection target time corresponding to the frame difference value, which is the current detection target, and a next peak appearance time, and thereafter estimating, at least in part on the basis of the time corresponding to the frame difference value in which the peak is detected before the detection target time; and
recording the number of frame image data, per unit time, for forming the moving image data in the static period to be smaller than in the operating period, when the moving image is recorded.

* * * * *